United States Patent
Ross et al.

(10) Patent No.: US 10,558,455 B1
(45) Date of Patent: Feb. 11, 2020

(54) MANAGING AN UPDATE OF A SOFTWARE MODULE IN A LAYERED FILESYSTEM

(71) Applicant: International Business Machines Corporation, Armonk, NY (US)

(72) Inventors: Martin A. Ross, Gosport (GB); Sam Rogers, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/167,581

(22) Filed: Oct. 23, 2018

(51) Int. Cl.
*G06F 9/44* (2018.01)
*G06F 8/658* (2018.01)
*G06F 8/71* (2018.01)
*G06F 9/455* (2018.01)
*G06F 11/00* (2006.01)
*G06F 16/11* (2019.01)

(52) U.S. Cl.
CPC ............ *G06F 8/658* (2018.02); *G06F 8/71* (2013.01); *G06F 9/45558* (2013.01); *G06F 11/008* (2013.01); *G06F 16/122* (2019.01); *G06F 2009/45562* (2013.01)

(58) Field of Classification Search
CPC ...... G06F 8/658; G06F 16/122; G06F 11/008; G06F 9/45558; G06F 8/71; G06F 2009/45562
See application file for complete search history.

(56) References Cited

U.S. PATENT DOCUMENTS

| | | | | |
|---|---|---|---|---|
| 7,822,758 | B1* | 10/2010 | Prakash | G06F 11/1435 707/698 |
| 2006/0265588 | A1* | 11/2006 | Lim | G06F 16/168 713/166 |
| 2010/0281083 | A1* | 11/2010 | Purtell, II | G06F 16/122 707/822 |
| 2011/0040812 | A1* | 2/2011 | Phillips | G06F 9/45541 707/822 |
| 2011/0061045 | A1* | 3/2011 | Phillips | G06F 9/45541 717/173 |
| 2011/0061046 | A1* | 3/2011 | Phillips | G06F 9/45533 717/176 |
| 2011/0313973 | A1* | 12/2011 | Srivas | H04L 65/102 707/634 |
| 2014/0324804 | A1* | 10/2014 | Chang | G06F 16/2272 707/696 |
| 2015/0363195 | A1* | 12/2015 | Schlueter | G06F 8/71 717/121 |

(Continued)

OTHER PUBLICATIONS

"Docket layer optimisation for Nose.js microservices", GitHub—eoinsha/node-seneca-base, latest comment on Oct. 12, 2017, downloaded from the Internet on Aug. 22, 2018, 2 pages, <https://github.com/eoinsha/node-seneca-base>.

(Continued)

*Primary Examiner* — Adam Lee
(74) *Attorney, Agent, or Firm* — Stephen R. Yoder; David B. Woycechowsky

(57) ABSTRACT

Managing an update of software modules of a layered filesystem installed for running a software application on a data processor. The management of an updated module includes: (i) contributing a back layer from a software module that likely has less stability than the updated module; and/or (ii) rebuilding a layer using a software module that likely has more stability than the updated layer.

18 Claims, 3 Drawing Sheets

(56) References Cited

U.S. PATENT DOCUMENTS

| | | |
|---|---|---|
| 2017/0052771 A1 | 2/2017 | Chen |
| 2017/0264684 A1 | 9/2017 | Spillane |
| 2018/0189122 A1* | 7/2018 | Jobi .................. G06F 9/455 |

OTHER PUBLICATIONS

"Npm-dedupe", Reduce duplication, <https://docs.npmjs.com/cli/dedupe>, downloaded from the Internet on Aug. 22, 2018, 2 pages.

"Npm-shrinkwrap", Lock down dependency versions for publicaiton, 1 page, downloaded from the Internet on Mar. 22, 2018, <https://docs.npmjs.com/cli/shrinkwrap>.

"Providing context to container technology build steps", Authors et. al.: Disclosed Anonymously, IP.com No. IPCOM000252896D, IP.com Electronic Publication Date: Feb. 20, 2018, 4 pages.

"Speeding up 'npm install' in docker #8836", GitHub, olalonde opened this issue on Jul. 6, 2015, 13 pages, <https://github.com/npm/npm/issues/8836>.

Weinstein, David, "Building Efficient Dockerfiles—Node.js", bitJudo, Mar. 13, 2014, 10 pages, <http://bitjudo.com/blog/2014/03/13/building-efficient-dockerfiles-node-dot-js/>.

* cited by examiner

MANAGING AN UPDATE OF A SOFTWARE MODULE IN A LAYERED FILESYSTEM

BACKGROUND

The present invention relates generally to an updating of a software module in a layered filesystem.

A given software product may be provided to a user in a software package that is typically built and managed using a software package manager. In this document, a software package manager (or "software package management system") is defined as any collection of software tools that automate the process of installing, upgrading, configuring, and removing computer programs for a computer's operating system in a consistent manner. A software package manager typically deals with packages, distributions of software and data in archive files. Software packages typically include metadata, such as the software's name, description of its purpose, version number, vendor, checksum, and a list of dependencies necessary for the software to run properly. Upon installation, metadata is typically stored in a local package database. Software package managers typically maintain a database of software dependencies and version information to prevent software mismatches and missing prerequisites. Software package managers typically work closely with software repositories, binary repository managers, and app stores. Software package managers are typically designed to eliminate the need for manual installs and updates, which can be particularly useful for large enterprises whose operating systems are based on Linux and other Unix-like systems, typically consisting of hundreds or even tens of thousands of distinct software packages.

A software product typically includes a software application that is made up of a relatively large number of "software modules." Each software module typically defines a given function (or set of functions) that is needed for running the software application on a data processor/computing system. Such a software module is compiled as code defining a set of instructions, which when executed by a data processor/computing system, causes the given function(s) associated with that software module to be performed by a computing device.

A software module may be provided as a part of a given software library stored in an online repository that is accessible to a user of the software package in which the software module is encapsulated. Software modules are changed by their developers relatively regularly in that they may, for example, be updated according to any modified functionality that they define in respect of a given software application and/or to fix any bugs reported in respect of their use. Given that software applications also undergo further development, relatively large dependency chains of software modules are typically formed and typically accumulate as this further development proceeds over time. This is especially true with high-level, interpreted programming languages that are dynamic, weakly typed, prototype-based and multi-paradigm (such as Javascript and package managers for Javascript).

In the specific case of a Node.js application to be run on a given data processor/computing system, it is installed and managed with an NPM (sometimes also referred to as "npm") package manager. An npm install command installs the dependency chains of software modules that are required for running the Node.js application on the processor/system. This is done by accessing a package.json file, which describes certain aspects of the Node.js application and also what dependency chains of corresponding software modules need to be installed for running the Node.js application. Apart from the installation and management of the Node.js application, an appropriate environment is required for running it. For example, this is conventionally sometimes done by using Docker container technology, specifically by accessing a given Docker file, which contains instructions on commands to run in order to create an appropriate system for running the Node.js application.

With respect to Docker containerization, it uses a layered filesystem to install layers including dependency chains of given software modules encapsulated in the Node.js application. The layers of a given Docker file are accessed/installed on a line-by-line basis to deploy the Node.js application on a given processor/system. The layers are rebuilt and re-installed when an associated change occurs in respect of the software modules required for running the Node.js application, in their corresponding dependency chains. For example, an npm install command would install the entire dependency chain of a layer in the Docker file, even if only a part of that dependency chain was updated/modified in the package.json file.

SUMMARY

According to an embodiment of a method aspect of the present invention, there is provided a software-implemented method for managing an update of at least one of multiple software modules of a layered filesystem installed for running a software application on a data processor, comprising: in response to an installation command being issued at the data processor, accessing a list of software module entries corresponding to software modules to be installed on the data processor; providing a stability scoring, reflecting a likelihood of an update being performed, in respect of each software module in the accessed list; rearranging the entries of the software modules on a basis of a stability ordering, which is derivable from the stability scoring performed in respect of the software modules, thereby yielding a reordered list; generating respective layers for the software modules in the reordered list and installing them on the data processor, and in response to a given software module in the layered filesystem being updated, rebuilding at least some of the layers in the layered filesystem, according to their stability ordering in the reordered list relative to the layer corresponding to the updated software module.

Preferably, an embodiment of the method aspect comprises: deriving the stability ordering so that respective entries of the software modules are arranged in the reordered list in an order of progression of an increased likelihood of being updated.

Desirably, an embodiment of the method aspect comprises: in response to the given software module in the layered filesystem being updated, contributing any back layer to the layered filesystem comprising a layer that has already been installed on the data processor and which has a software module entry preceding that for the given updated software module in the reordered list.

Preferably, an embodiment of the method aspect comprises: in response to the given software module in the layered filesystem being updated, rebuilding any layer corresponding to a software module with an entry subsequent to that for the given updated software module in the reordered list.

Desirably, an embodiment of the method aspect comprises: providing stability scoring in respect of any given software module on at least a basis of one of: historical data and analysis of associated metadata.

Preferably, an embodiment of the method aspect comprises: providing the software modules as a part of a software package manager deployed in conjunction with given container technology for running a given software application on the data processor.

According to an embodiment of a further aspect of the present invention, there is provided a system for managing an update of at least one of multiple software modules of a layered filesystem installed for running a software application on a data processor, comprising: a stability calculator that is operably coupled to at least the data processor and that is configurable to: access a list of software module entries corresponding to software modules to be installed on the data processor; provide a stability scoring, reflecting a likelihood of an update being performed, in respect of each software module in the accessed list, and to rearrange the entries of the software modules on a basis of a stability ordering, which is derivable from the stability scoring performed in respect of the software modules, thereby yielding a reordered list; a layer generator that is operably coupled to at least the stability calculator and the data processor and that is configurable to: generate respective layers for the software modules in the reordered list and to install them on the data processor, and a layer manager that is operably coupled to the layer generator, stability calculator and data processor and that is configurable to: facilitate rebuilding of at least some of the layers in the layered filesystem, according to their stability ordering in the reordered list relative to a layer corresponding to a given updated software module, in response to the given software module in the layered filesystem having been updated.

According to an embodiment of yet a further aspect of the present invention, there is provided a computer program product for managing an update of at least one of multiple software modules of a layered filesystem installed for running a software application on a data processor, the computer program product comprising a computer readable storage medium having program instructions embodied therewith, the program instructions being executable by the data processor to cause the processor to facilitate: in response to an installation command being issued at the data processor, accessing of a list of software module entries corresponding to software modules to be installed on the data processor; provision of a stability scoring, reflecting a likelihood of an update being performed, in respect of each software module in the accessed list; rearrangement of the entries of the software modules on a basis of a stability ordering, which is derivable from the stability scoring performed in respect of the software modules, thereby yielding a reordered list; generation of respective layers for the software modules in the reordered list and installing them on the data processor, and in response to a given software module in the layered filesystem being updated, to facilitate rebuilding of at least some of the layers in the layered filesystem, according to their stability ordering in the reordered list relative to the layer corresponding to the updated software module.

All the advantages of any one of the features of an embodiment of one aspect of the present invention are also imparted to an embodiment of any other aspect.

The present invention has been described purely by way of example and modifications of detail may be made within the scope of the invention.

Each feature disclosed in the description and, where appropriate, the claims and drawings may be provided independently or in any appropriate combination.

According to an aspect of the present invention, a software-implemented method, computer program product and/or computer system manages an update of at least one of multiple software modules of a layered filesystem installed for running a software application on a data processor, through the following operations (not necessarily in the following order): (i) responsive to an installation command being issued at the data processor, accessing a list of software module entries respectively corresponding to software modules to be installed on the data processor; (ii) for each given software module in the accessed list of software module entries: (a) providing a respectively corresponding stability score value, with the stability score value indicating a probability of an update being performed at a future time on the given software module, (b) generating a respectively corresponding set of layer(s), and (c) installing the respectively corresponding set of layer(s) on the data processor; (iii) creating a layered filesystem based on the installed sets of layer(s); (iv) determining a stability order for the entries in the list of software module entries, with the stability order corresponding to the stability score values of the software modules; and (v) updating a first software module of the plurality of software modules, with the updating including: (a) determining a second software module of the plurality of software modules that occurs prior to the first software module in the stability order, and (b) contributing, by the second software module, a back layer.

According to a further aspect of the present invention, a software-implemented method, computer program product and/or computer system manages an update of at least one of multiple software modules of a layered filesystem installed for running a software application on a data processor, through the following operations (not necessarily in the following order): (i) responsive to an installation command being issued at the data processor, accessing a list of software module entries respectively corresponding to software modules to be installed on the data processor; (ii) for each given software module in the accessed list of software module entries: (a) providing a respectively corresponding stability score value, with the stability score value indicating a probability of an update being performed at a future time on the given software module, (b) generating a respectively corresponding set of layer(s), and (c) installing the respectively corresponding set of layer(s) on the data processor; (iii) creating a layered filesystem based on the installed sets of layer(s); (iv) determining a stability order for the entries in the list of software module entries, with the stability order corresponding to the stability score values of the software modules; and (v) updating a first software module of the plurality of software modules, with the updating including: (a) determining a second software module of the plurality of software modules that occurs subsequent to the first software module in the stability order, and (b) rebuilding a layer using the second software module.

BRIEF DESCRIPTION OF THE DRAWINGS

Reference will now be made, by way of example, to the accompanying drawings, in which.

DETAILED DESCRIPTION

Some embodiments of the present invention are directed to managing an update of software modules of a layered filesystem installed for running a software application on a data processor. The management of an updated module may include: (i) contributing a back layer from a software module that likely has less stability than the updated module; and/or (ii) rebuilding a layer using a software module that likely has more stability than the updated layer. This Detailed Description section is divided into the following sub-sections: (i) The Hardware and Software Environment; (ii) Explanations And Embodiment(s); and (iii) Definitions.

I. The Hardware and Software Environment

Figure 3:
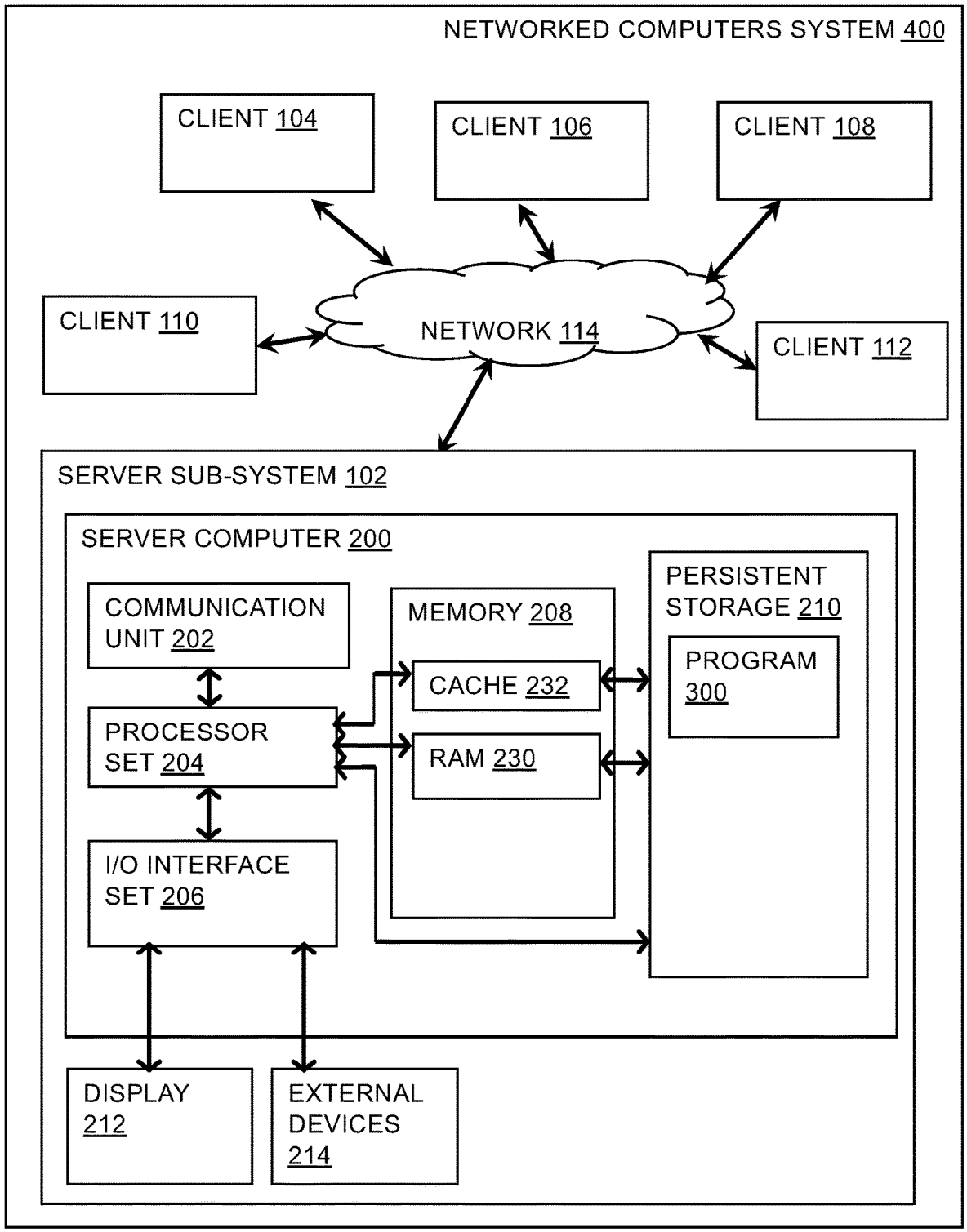
FIG. 3 shows a block diagram of a networked computers computing environment in which various embodiments of the present invention may operate.

An embodiment of a possible hardware and software environment for software and/or methods according to the present invention will now be described in detail with reference to the Figures. FIG. 3 is a functional block diagram illustrating various portions of networked computers system 400, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Explanations and Embodiment(s)

Some embodiments of the present invention recognize the following facts, potential problems and/or potential areas for improvement with respect to the current state of the art: (i) it is time and resource consuming to install the entire dependency chain every time an update is performed on a part thereof; (ii) it may prove challenging to mitigate some of the drawbacks associated with resource consumption in container technologies; and/or (iii) it may be especially difficult to mitigate the foregoing drawback(s) in a context of any build steps that are performed in response to an update of any part of a given dependency chain.

Within the description, the same reference numerals or signs are used to denote the same parts or the like. The reference numerals are not indicative of any order of importance and/or sequence of operation in respect of parts of any given embodiment of the present invention.

Figure 1:
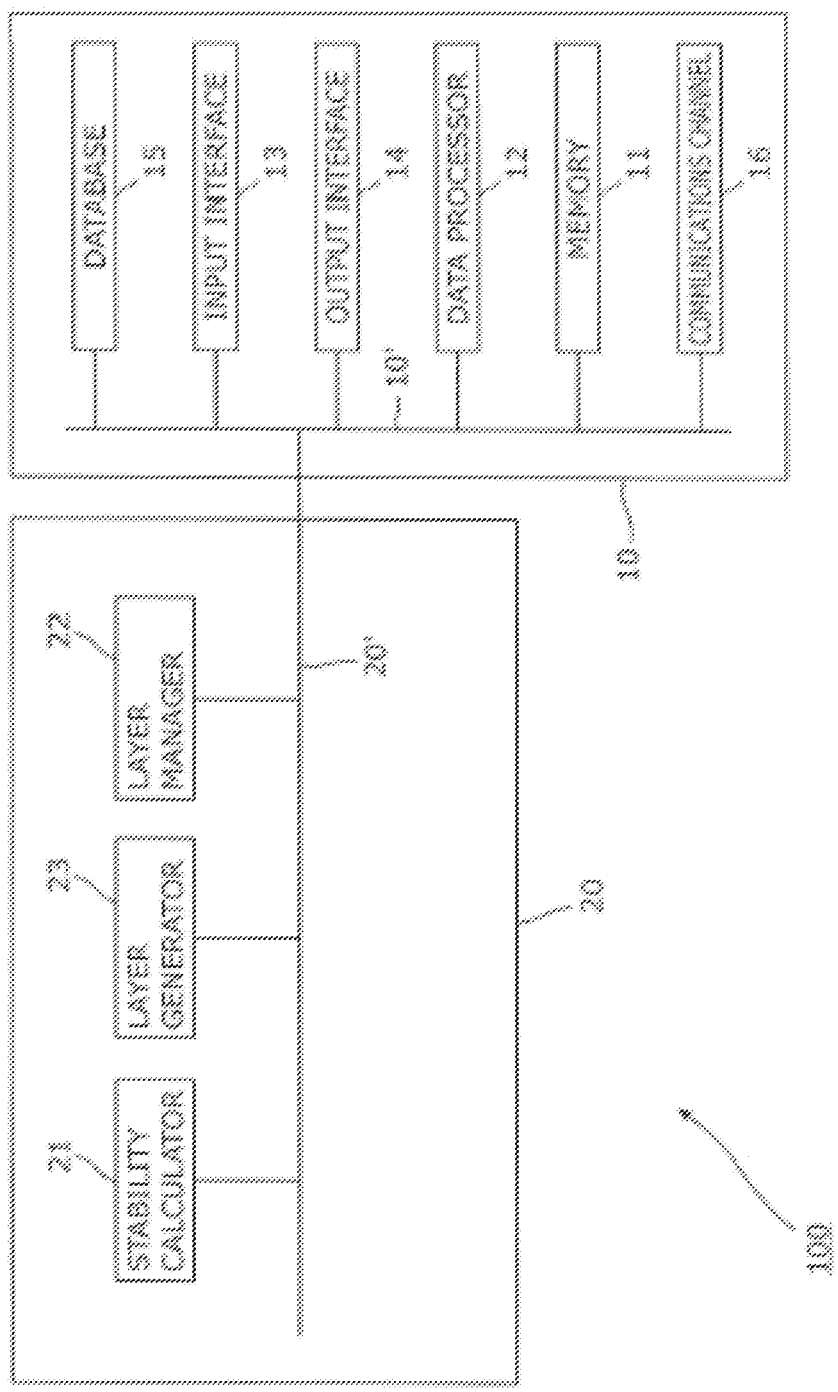
FIG. 1 schematically illustrates a general framework of an embodiment of a system aspect of the present invention.

Reference is now made to FIG. 1, which schematically illustrates an embodiment of a system aspect 100 of the present invention implemented for managing an update of at least one of multiple software modules of a layered filesystem, installed for running a software application on a data processor.

As can be seen from FIG. 1, an embodiment of the system aspect 100 of the present invention comprises first and second configurational aspects 10, 20.

The first configurational aspect 10 comprises: a memory 11 that is configurable to store at least an executable instruction, a data processor 12 that is operatively coupled to the memory 11 and configurable to execute any instruction that is received at the data processor 12 and/or stored in the memory 11. Executable instructions may be provided to the data processor 12 via input interface 13 and/or by the running of a software program product according to an embodiment of the present invention. An output interface 14 is also provided to facilitate display of any virtual item generated by running a given executable instruction received at the data processor 12. A database 15 is provided for storing any data generated from executing an instruction at the data processor 12. A communications channel 16 is also provided to facilitate communication with other externally provided devices. It may comprise a communication medium that may, for example, generally be wireless or wired media.

The second configurational aspect 20 is implemented by the provision of at least a stability calculator 21, a layer manager 22 and a layer generator 23, which are operatively coupled to each other.

Operative coupling within and between the first and second configurational aspects 10, 20 may be performed discernibly and may be facilitated by respectively provided buses 10', 20'. Such operative coupling is not limited to the use of buses 10', 20' and may be performed in any other appropriate way within the scope of an embodiment of the present invention.

Figure 2:
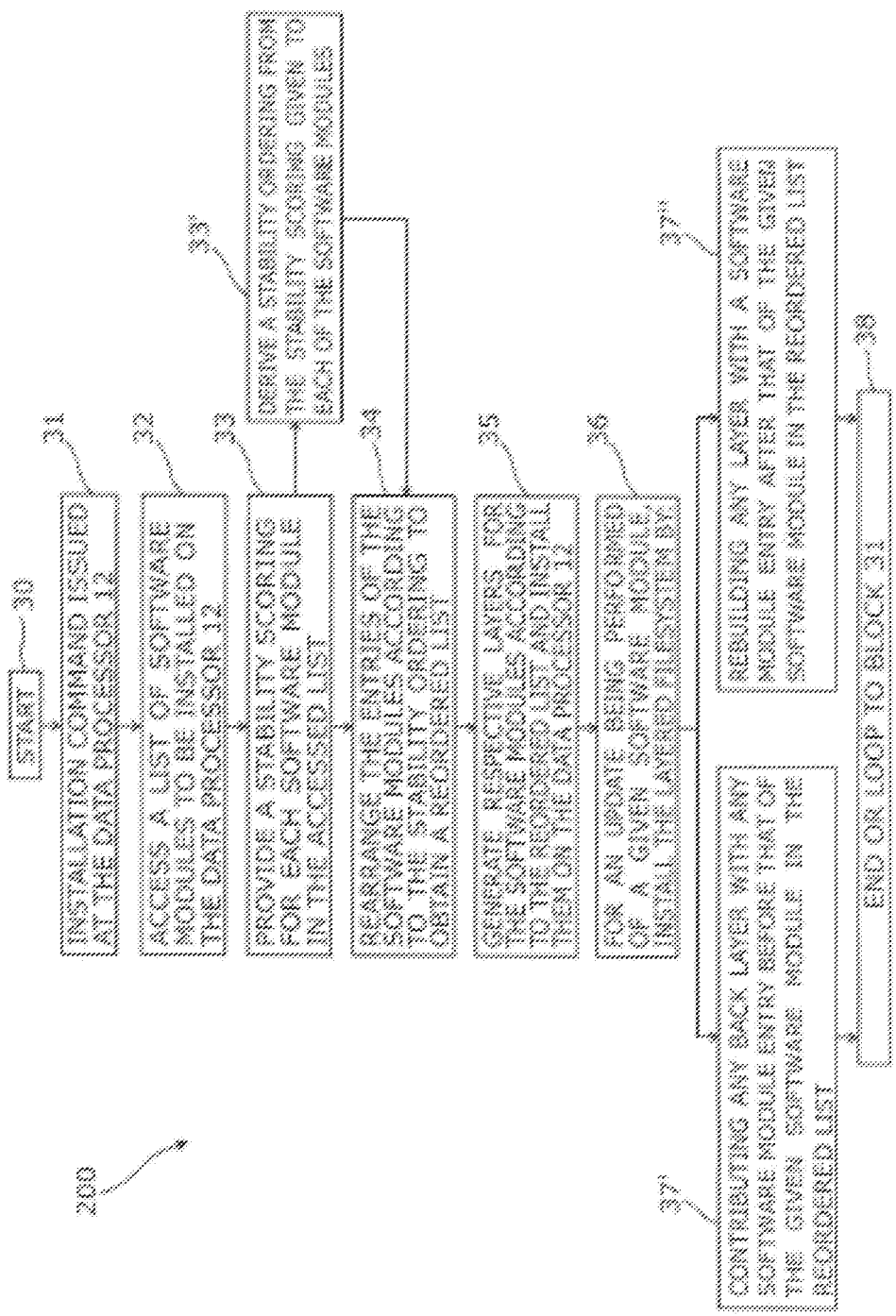
FIG. 2 shows a flowchart of an embodiment of a method aspect of the present invention.

Operation of an embodiment of the system aspect 100 is described now in conjunction with an embodiment of a method aspect 200 of the present invention, which is shown in the flowchart in FIG. 2, for managing an update of at least one of multiple software modules of a layered filesystem, installed for running a software application on the data processor 12.

Referring now to FIG. 2, it starts at block 30. In response to an installation command issued at block 31, a list of the software module entries corresponding to the software modules installed on the data processor 12 is accessed at block 32. This is done by the stability calculator 21, which forms a part of the configurational aspect 20 in FIG. 1.

At block 33, the accessed list is processed by the stability calculator 21, by the provision of a stability scoring, reflecting a likelihood of an update being performed, in respect of each software module entry. The stability scoring provided in respect of any given software module may be based on at least one of historical data and analysis of associated metadata in an embodiment of the present invention.

At block 33', a stability ordering is derived by the stability calculator 21 from the stability scoring that was performed at block 33.

At block 34, the stability ordering derived at block 33' is used, by the stability calculator 21, to rearrange the entries of the software modules into a reordered list. The stability calculator 21 is operable to transmit the reordered list to the layer generator 23, which forms a part of the configurational aspect 20 in FIG. 1.

In a preferred embodiment of the present invention, the stability ordering that is derived at block 33' by the stability calculator 21, for use in compiling the reordered list at block 34, is such that respective entries of the software modules are arranged in an order of progression of an increased likelihood of being updated in the reordered list. So, an entry at the beginning of the reordered list would be for a software module that is never or very rarely updated, and the last entry would be for a software module that is updated the most out of all the listed software modules.

At block 35, the layer generator 23 is operable to generate respective layers for the software modules in the reordered list that was compiled at block 34, and to communicate them to the data processor 12 where they are accordingly installed.

In response to a given software module in the layered filesystem being updated at block 36, given actions are performed by the layer manager 22, one of which is shown at block 37' comprising: contributing any back layer to the layered filesystem comprising a layer that has already been installed on the data processor 12 and which has a software module entry preceding that for the given updated software module in the reordered list. So, those cached layers of the layered filesystem installed on the data processor 12, which correspond to software modules that are updated rarely, or with reduced frequency compared to the updated software module, are reused when incorporating a layer comprising the updated software module in the layered filesystem. In this way, reduced administrative and/or processing resources may be used for the incorporation of the updated version of the software module on the data processor 12. Also, an overall build time in terms of installing the layered filesystem comprising the updated software module may be reduced.

Another action that is performed by the layer manager 22 is shown at block 37" comprising: rebuilding any layer of the layered filesystem on the data processor 12, which corresponds to a software module with an entry subsequent to that for the given updated software module in the reordered list.

In a preferred embodiment of the present invention, the layer manager 22 is operable to perform the layer rebuilding of block 37" after contributing any back layers according to block 37' in order to reconstruct the layered filesystem incorporating any software module with an updated version.

For performing the actions of block 37' and 37", the reordered list and/or stability ordering is communicated to the layer manager 22 by the stability calculator 21, or they are derivable by the layer manager 22 from the layer generator 23.

Block 38 marks the end of an embodiment of the method aspect 200 of the present invention or a loop is performed back to block 31 over a specifiable period of time in order to address any further software module updates.

In an embodiment of the present invention, the software modules are provided as a part of a software package manager deployed in conjunction with given container technology, for example, Docker containerization, for running a given software application on a data processor 12. In this regard, taking an example of the following Docker.file:

ADD package.json/opt/app/package.json
RUN cd/opt/app && npm install
ADD app/opt/app
. . .
CMD ["npm", "start"]

In this example, package.json is added to an image in a first layer, and an install is performed contributing to a second layer. The application code is added in as a third layer. If only the application code is modified, then layers 1 and 2 would not have to be rebuilt/re-pulled. If package.json is modified, then the whole npm install layer is rebuilt, that is, all the packages would need to be pulled back. An embodiment of the present invention may be applied to this example as in the following steps:

1. Container is built;
2. The npm install in the RUN step identifies running in Docker by the existence of env_var, for example, and installs each dependency/software module in turn and creates a layer for each, which corresponds to blocks 30 to 35 in an embodiment of the method aspect 200 of the present invention as shown in FIG. 2;
3. npm contributes the layers created in step 2 back up to Docker individually, which corresponds to the installation referenced in block 35 shown in FIG. 2;
4. The build completes;
5. Container is rebuilt as a modification/update is performed in respect of a given layer, which corresponds to block 36 in FIG. 2;
6. A new minor level of one of the dependencies/software modules is released with a security bug fix, and
7. Cached layers corresponding to dependencies/software modules that are rarely/infrequently changed are installed before the updated dependency/software module, according to block 37' in FIG. 2, and all layers of dependencies that are frequently updated are rebuilt after the installation of the updated dependency/software module, this being done according to block 37" in FIG. 2.

In steps 2 and 7, the npm command may optimize the respective layers created in respect of each of the dependencies/software modules such that those that rarely change and/or rarely need to change are contributed up first in the build step subsequent to an update in respect of the package.json file.

In a scenario such as the present example, the stability scoring done at block 33 and/or stability ordering done at block 33' in FIG. 2 may done by analysis of metadata associated with the package.json file to order, for example, exact updates (2.8.9), minor updates pulled (~2.8.x), major updates pulled (~2.x.x) or version updates pulled (x). Metadata retrieved from an associated remote package management site, that is, a remote location where the packages and/or modules that are referenced in package.json are stored and downloaded from, may be used as input to the stability ordering/stability scoring according to an embodiment of the present invention. For an input to the stability scoring/stability ordering, the number of commits and/or update history may also be used, however, an embodiment of the present invention is not limited thereto and, indeed, any other appropriate historical data may be used.

An embodiment of the present invention may be implemented in conjunction with any virtualization and/or containerization technology implementing a layered approach.

In the previously-given example, operation of an embodiment of the present invention was described in conjunction with an npm command being used to initiate the rebuild. However, it is not restricted thereto, and it may be implemented with an ant or maven command, or any other command that is appropriate within a scope of the present invention.

The concept of layered filesystems in the context of Container based computing environments (to which some embodiments of the present invention may be applicable) will now be discussed. In some embodiments, a layered filesystem technology is typically a filesystem that is built up by layers (for example, filesystems employed by Docker containers are considered a type of layered filesystem). Each added layer of the layered filesystem provides a "delta" on top of the preceding layer. Take, for example, the following Docker file:

FROM node:8
RUN mkdir /app
COPY package.json /app/package.json
RUN cd /app && npm install
COPY ./app
WORKDIR /app
CMD ["node", "server.js"]

With respect to this Docker file, the first layer when building the Docker image is "node:8." This "node:8" is the base image that is used to build on top of and includes Linux and pre-requisites for Node.js.

The "RUN mkdir /app" contributes a layer on top of this "node:8" base (which is the "delta" that this command causes on the filesystem—in this case a new directory "/app"). The "COPY package.json /app/package.json" contributes another layer on top, which is the package.json file. The "RUN cd /app && npm install" command contributes yet another layer to the layered filesystem and is the result of installing all of the required packages for this Node.js application. This analysis continues for each given operation of the Docker file above.

These operations are added in order as layers on top of each other. In some embodiments, if the "package.json" file is modified and re-build "node:8" layer stays the same (by using the cached version of node:8), then "RUN mkdir /app" would result in the same output. In this embodiment, the cached version of "RUN mkdir /app" is used, but "package.json" is modified so that the cached layer cannot be used and a new layer must be created. It is important to note that because these operations are "layered," this now invalidates the preceding layers on top, which requires that "RUN cd /app && npm install" be re-run and "contributed" to the top layer.

The present invention may be a system, a method and/or a computer program product at any possible technical level of integration. The computer program product may include a computer readable storage medium (or media) having computer readable program instructions thereon for causing a processor to carry out the aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable storage instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages including an object oriented program language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In any of the above aspects, the various features may be implemented in hardware or as software modules running on one or more data processors.

The present invention has been described above purely by way of example and modifications of detail can be made within the scope of the present invention.

Each feature disclosed in the description, and where appropriate, the claims and/or the drawings may be provided independently or in any appropriate combination.

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A software-implemented method for a data processor, the method comprising:
   responsive to an installation command being issued at the data processor, accessing a list of a plurality of software module entries respectively corresponding to a plurality of software modules to be installed on the data processor;
   providing a respectively corresponding stability score value for each given software module in the accessed list of software module entries, with the stability score value indicating a probability of an update being performed at a future time on the given software module;
   determining a stability order for the entries in the list of software module entries, with the stability order corresponding to the stability score values of the software modules;
   rearranging the software module entries according to the stability order to obtain a reordered list;
   generating a respectively corresponding layer for each software module;
   installing the layers on the data processor;
   creating a layered filesystem based on the installed layers; and
   updating a first software module of the plurality of software modules, with the updating including:
      determining a second software module of the plurality of software modules that occurs prior to the first software module in the stability order, and
      rebuilding at least some of the layers in the layered filesystem according to their stability ordering in the reordered list relative to the first layer, wherein the first layer corresponds to the first software module.

2. A method as claimed in claim 1 wherein the determination of the stability order for the entries in the list of software module entries determines the stability order to reflect an increasing degree of stability.

3. A method as claimed in claim 1 wherein the second software module immediately precedes the first software module in the stability order.

4. A method as claimed in claim 1 wherein the stability score values are provided based on historical data.

5. A method as claimed in claim 1 wherein the stability score values are provided based on an analysis of associated metadata.

6. A method as claimed in claim 1 further comprising:
   deploying, by a software package manager, the plurality of software modules and the layered filesystem using containers to run a software application on the data processor.

7. A software-implemented method for a data processor, the method comprising:
   responsive to an installation command being issued at the data processor, accessing a list of a plurality of software module entries respectively corresponding to a plurality of software modules to be installed on the data processor;
   providing a respectively corresponding stability score value for each given software module in the accessed list of software module entries, with the stability score value indicating a probability of an update being performed at a future time on the given software module;
   determining a stability order for the entries in the list of software module entries, with the stability order corresponding to the stability score values of the software modules;
   rearranging the software module entries according to the stability order to obtain a reordered list;
   generating a respectively corresponding layer for each software module;
   installing the layers on the data processor;
   creating a layered filesystem based on the installed layers; and
   updating a first software module of the plurality of software modules, with the updating including:
      determining a second software module of the plurality of software modules that occurs subsequent to the first software module in the stability order, and
      rebuilding a layer in the layered filesystem using the second software module.

8. A method as claimed in claim 7 wherein the determination of the stability order for the entries in the list of software module entries determines the stability order to reflect an increasing degree of stability.

9. A method as claimed in claim 7 wherein the second software module occurs immediately subsequent to the first software module in the stability order.

10. A method as claimed in claim 7 wherein the stability score values are provided based on historical data.

11. A method as claimed in claim 7 wherein the stability score values are provided based on an analysis of associated metadata.

12. A method as claimed in claim 7 further comprising:
deploying, by a software package manager, the plurality of software modules and the layered filesystem using containers to run a software application on the data processor.

13. A software-implemented method for a data processor, the method comprising:
responsive to an installation command being issued at the data processor, accessing a list of a plurality of software module entries respectively corresponding to a plurality of software modules to be installed on the data processor;
providing a respectively corresponding stability score value for each given software module in the accessed list of software module entries, with the stability score value indicating a probability of an update being performed at a future time on the given software module;
determining a stability order for the entries in the list of software module entries, with the stability order corresponding to the stability score values of the software modules;
rearranging the software module entries according to the stability order to obtain a reordered list;
generating a respectively corresponding layer for each software module;
installing the layers on the data processor;
creating a layered filesystem based on the installed layers; and
updating a first software module of the plurality of software modules, with the updating including:
determining a second software module of the plurality of software modules that occurs prior to the first software module in the stability order, and
rebuilding at least some of the layers in the layered filesystem according to their stability ordering in the reordered list relative to the first layer, wherein the first layer corresponds to the first software module;
updating a third software module of the plurality of software modules, with the updating including:
determining a fourth software module of the plurality of software modules that occurs subsequent to the third software module in the stability order, and
rebuilding a layer in the layered filesystem using the fourth software module.

14. A method as claimed in claim 13 wherein the determination of the stability order for the entries in the list of software module entries determines the stability order to reflect an increasing degree of stability.

15. A method as claimed in claim 13 wherein the second software module immediately precedes the first software module in the stability order.

16. A method as claimed in claim 13 wherein the stability score values are provided based on historical data.

17. A method as claimed in claim 13 wherein the stability score values are provided based on an analysis of associated metadata.

18. A method as claimed in claim 13 further comprising:
deploying, by a software package manager, the plurality of software modules and the layered filesystem using containers to run a software application on the data processor.

* * * * *